United States Patent
Lorch et al.

(10) Patent No.: US 7,334,154 B2
(45) Date of Patent: Feb. 19, 2008

(54) EFFICIENT CHANGING OF REPLICA SETS IN DISTRIBUTED FAULT-TOLERANT COMPUTING SYSTEM

(75) Inventors: Jacob R. Lorch, Bellevue, WA (US); Jonathan R. Howell, Seattle, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 10/871,134

(22) Filed: Jun. 18, 2004

(65) Prior Publication Data

US 2005/0283644 A1 Dec. 22, 2005

(51) Int. Cl.
*G06F 11/00* (2006.01)
(52) U.S. Cl. .............................. 714/4; 714/11; 714/13
(58) Field of Classification Search .................... 714/4, 714/13, 11
See application file for complete search history.

(56) References Cited

U.S. PATENT DOCUMENTS

| | | | |
|---|---|---|---|
| 6,393,485 B1 * | 5/2002 | Chao et al. | 709/231 |
| 6,401,120 B1 * | 6/2002 | Gamache et al. | 709/226 |
| 6,438,705 B1 * | 8/2002 | Chao et al. | 714/4 |
| 6,671,821 B1 | 12/2003 | Castro et al. | |
| 6,877,107 B2 * | 4/2005 | Giotta et al. | 714/4 |

OTHER PUBLICATIONS

Adya, A. et al. FARSITE: Federated, available, and reliable storage for an incompletely trusted environment. In Proc. 5th OSDI, pp. 1-14, Boston, MA, Dec. 2002.

Anceaume et al., "Converging Toward Decision Conditions" 6th International Conference on Principles of Distributed Systems, France, pp. 53-63 (Dec. 11-13, 2002).

Awerbuch, Baruch et al.; *Maintaining Database Consistency in Peer to Peer Networks*; Department of Computer Science, John Hopkins University; Technical Report CNDS-2002-1; Feb. 6th, 2002; pp. 1-14.

Birrell, Andrew D. et al.; *The Echo Distributed File System*; Digital Equipment Corp. Systems Research Center; Technical Report 111; Sep. 10, 1993; pp.1-22.

Bracha, Gabriel, "An asynchronous $\lfloor (n-1)/3 \rfloor$ resilient consensus protocol" this paper was presented at the *ACM Symposium on Principles of Distributed Computing* 1984, pp. 154-162.

Brasileiro et al., "IRISA Research Report No. 1321" (Apr. 2000).

Canetti, R. et al.; *Fast asynchronous Byzantine agreement with optimal resilience*; Proc. 25th Annual ACM Symposium on Theory of Computing (STOC), pp. 42-51, 1993.

(Continued)

*Primary Examiner*—Yolanda L Wilson
(74) *Attorney, Agent, or Firm*—Lee & Hayes, PLLC

(57) ABSTRACT

A distributed computing system can be operated in a fault tolerant manner using a set of computing devices. A set of computing devices can tolerate a number of failures by implementing identical replicas of a state machine and selecting proposals. The set of computing devices participating in the distributed computing system by hosting replicas can be modified by adding or removing a computing device from the set, or by specifying particular computing devices for participation. Changing the participating computing devices in the set increases fault tolerance by replacing defective devices with operational devices, or by increasing the amount of redundancy in the system.

21 Claims, 8 Drawing Sheets

OTHER PUBLICATIONS

Castro, M. et al. BASE: Using abstractions to improve fault tolerance. In Proc. 18th ACM Symposium on Operating System Principles, pp. 15-28, Banff, Canada, Oct. 2001.

Castro, M., Practical Byzantine fault tolerance. Ph.D. thesis technical report MIT-LCS-TR-817, MIT, Jan. 2001.

Castro, Miguel, et al., "Practical Byzantine Fault Tolerance", appears in *Proceedings of the Third-Symposium on Operating Design and Implementation*, New Orleans, USA, Feb. 1999, pp. 1-14.

Castro, Miguel, et al., "Proactive Recovery in a Byzantine-Fault-Tolerant System", appears in the *Proceedings of the Fourth Symposium on Operating Systems Design and Implementation* (OSDI '00), San Diego, USA, Oct. 2000, pp. 1-15.

Chockler, G.V. et al. Group communication specifications: a comprehensive study. ACM Computing Surveys, 33(4):427-469, Dec. 2001.

Cukier, M., Ren, J., Sabnis, C., Henke, D. Bakken, D.E., Berman, M.E., Karr, D.A., and Schantz, R.E. AQuA: An adaptive architecture that provides dependable distributed objects. In Proc. 17th Symposium on Reliable Distributed Systems, pp. 245-253, West Lafayette, IN, Oct. 1998.

DePrisco, R. Revisiting the Paxos algorithm, In Proc. 11th Int'l Workshop on Distributed Algorithms, pp. 111-125, Sep. 1997.

Deswarte, Y. et al; *Intrusion Tolerance in Distributed Computing Systems; Proceedings of the 1991 IEEE Symposium on Research in Security and Privacy*; pp. 110-121, May 1991.

Goldberg, A. et al.; *Towards an Archival Intermemory; International Forum on Research and Technology Advances in Digital Libraries*; IEEE, pp. 147-156, 1998.

Gong, L. et al.; *Byzantine Agreement With Authentication: Observations and Applications in Tolerating Hybrid and Link Faults; Dependable Computing for Critical Applications*—5, pp. 79-90, IFIP WG 10.4, preliminary proceedings, 1995.

Guerraoui, Rachid et al.; *Reducing the Cost for Non-Blocking in Atomic Commitment*; Deépartement d'Informatique, Ecole Polytechnique Federále de Lausanne; May 1996; pp. 1-11.

Hartman, J.H. et al.; *The Swarm Scalable Storage System; 19th ICDCS*; pp. 74-81, 1999.

Hayashibara, Noahiro et al.; *Performance Comparison Between the Paxos and Chandra-Toueg Consensus Algorithms*; Départment d'Informatique, Ecole Polytechnique Federále de Lausanne; Technical Report IC-2002-61; Aug. 2002; pp. 1-11.

Hisgen, Andy et al.; *New-Value Logging in the Echo Replicated File System*; Digital Equipment Corp. Systems Research Center, Research Report 104; Jun. 1993; pp. 1-39.

Huang, Yennun, et al., "Software Rejuvenation: Analysis, Module and Applications", *Proc. International Symposium on Fault Tolerant Computing*, pp. 381-390, (1995).

Keidar, Idit, et al., "Moshe: A Group Membership Service for WANs" to appear in *ACM Transactions on Computer Systems(TOCS)*, Aug. 2002, pp. 1-47.

Khazan, Roger, I., "A One-Round Algorithm for Virtually Synchronous Group Communication in Wide Area Networks", PH.D. dissertation, Department of Electrical Engineering and Computer Service. MIT., May 22, 2002. Thesis Supervisors: Prof. Nancy A. Lynch and Dr. Idit Keidar. Retrieved from http://theroy.1cs.mit.edu/~roger/Research/Papers /khazan-phd.pdf.

Kihlstrom, K. P. et al.; *Solving Consensus in a Byzantine Environment Using an Unreliable Fault Detector; Proceedings of the International Conference on Principles of Distributed Systems (OPODIS'97)*, Hermes, Chantilly, France, 61-76, 1997.

Kihlstrom, K. P. et al.; *The SecureRing Protocols for Securing Group Communication; Proceedings of the 13st Hawaii International Conference on System Sciences*, vol. 3, pp. 317-326, Jan. 1998.

Lamport, L. Cheap Paxos. In Proc. International Conference on Dependable Systems and Networks (DSN), Florence, Italy, 2004.

Lamport, Leslie, "Paxos Made Simple", *ACM SIGACT* News (Distributed Computing Column), 32,4 (Whole No. 121, Dec. 2001) pp. 18-25.

Lamport, Leslie, "The Part-Time Parliament", *ACM Transactions on Computer Systems* 16, 2 (May 1998), pp. 133-169. Also appeared as SRC Research Report 49.

Lamport, L. How to write a proof. American Mathematical Monthly, 102(7):600-608, Aug.-Sep. 1993.

Lamport, L. Using time instead of timeout for faulttolerance in distributed systems. ACM Transactions on Programming Languages and Systems (TOPLAS), 6(2): 254-280, Apr. 1984.

Lamport, Leslie, "Time, Clocks, and the Ordering of Events in a Distributed System", Communication of the ACM, 21(7):558-565, Jul. 1978.

Lampson, Butler W., "The ABCD's of Paxos", Presented at *Principles of Distributed Computing*, 2001, as one of the papers celebrating Leslie Lamport's 60th Birthday, retrieved from http://research.microsoft.com/lampson/65-ABCDPaxos/Acrobat.pdf.

Liskov, Barbara et al.; *Replication in the Harp File System*; Proceedings of the 13th Symposium on Operating System Principles; Oct. 1991; 13 pp.

Long, Darrell D.E. et al.; *Voting with Regenerable Volatile Witnesses*; University of California Computer and Information Sciences; Technical Report; Apr. 1990; pp. 1-20.

Lynch, N. Rambo: A reconfigurable atomic memory service for dynamic networks. In Proc. 16th International Symposium on Distributed Computing, pp. 173-190, Toulouse, France, Oct. 2002.

Malkhi, D. et al.; *A High-Throughput Secure Reliable Multicast Protocol; Proceedings of the 9th Computer Security Foundations Workshop*, Kenmore, Ireland, pp. 9-17, Jun. 1996.

Malkhi, D. et al.; *A High-Throughput Secure Reliable Multicast Protocol; Journal of Computer Security*. Also in *Proceedings of the 9th IEEE Computer Security Foundations Workshop*, pp. 9-17, Jun. 1996.

Malkhi, D. et al.; *Byzantine Quorum Systems; Distributed Computing*; vol. 11, No. 4, p. 203-213, 1998.

Malkhi, D. et al.; *Byzantine Quorum Systems; Proceedings of the 29th ACM Symposium on Theory of Computing*, May 1997.

Malkhi, D. et al.; *Secure and Scalable Replication in Phalanx; Proceedings of the 17th IEEE Symposium on Reliable Distributed Systems*; p. 51-58, West Lafayette, Indiana, USA, Oct. 1998.

Malkhi, D. et al.; *The Load and Availability of Byzantine Quorum Systems; Proceedings 16th ACM Symposium on Principles of Distributed Computing (PODC)*, pp. 249-257, Aug. 1997.

Mostefaoui et al., "IRISA-Research Report No. 1355" (Oct. 2000).

Narasimham, P. Replica consistency of CORBA objects in partitionable distributed systems, Distributed Systems Engineering 4, pp. 139-150, 1997.

Oki, B.M. Viewstamped replication: a new primary copy method to support highly-available distributed systems. In Proc. 7th Symposium on Principles of Distributed Computing, pp. 8-17, Aug. 1988.

Oki, B.M. Viewstamped replication for highly available distributed systems. Ph.D. thesis technical report MIT/LCS/TR-423, MIT, Aug. 1988.

Reiter, M. K.; *Distributing Trust With the Rampart Toolkit; Communications of the ACM*; 39, 4 pp. 71-74, Apr. 1996.

Reiter, M. K.; *Secure Agreement Protocols: Reliable and Atomic Group Multicast in Rampart; Proceedings of the 2nd ACM Conference on Computer and Communications Security*, pp. 68-80, Fairfax, Virginia, Nov. 1994.

Reiter, M. K.; *The Rampart toolkit for building high-integrity services; Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110, 1995.

Reiter, M; *How to Securely Replicate Services; ACM Transactions on Programming Languages and Systems*, vol. 16, No. 3, pp. 986-1009, May 1994.

Ren, J. et al. AQuA: An adaptive architecture that provides dependable distributed objects. In IEEE Transactions on Computers, 52(1), pp. 31-50, Jan. 2003.

Schneider, F.; *Implementing Fault-tolerant Services Using the State Machine Approach: A Tutorial; Computing Surveys*, 22(3):299-319, Sep. 1990.

Schneider, F.B. Synchronization in distributed programs. ACM Transactions on Programming Languages and Systems (TOPLAS), 4(2):125-148, Apr. 1982.

Swart, Garret et al.; *Availability in the Echo File System*; Digital Equipment Corp. Systems Research Center, Research Report 112; Sep. 1993; pp. 1-43.

Yu, H. Consistent and automatic replica regeneration. In Proc. 1st NSDI, pp. 323-326, San Francisco, CA, 2004.

Aguilera, M. et al., "Stable Leader Election" in *Lecture Notes in Computer Science*, vol. 2180, p. 108, Springer-Verlag, 2001.

Boichat et al, "Deconstructing Paxos" Sigact News ACM USA, vol. 34, No. 1, Mar. 2003, pp. 47-67.

Boichat et al, "Reconstructing Paxos" Sigact News ACM, USA, vol. 34, No. 2, Jun. 2003, pp. 42-57.

European Search Report, Application No. EP 05105188, Apr. 19, 2006, 3 pages.

Howell et al, "Correctness of Paxos with Replica-Set-Specific Views" Microsoft Research Publications, (online) Jun. 2004, pp. 1-52.

Lamport, "Paxos Made Simple" Microsoft Research Publications, (online) Nov. 1, 2001. 14 pages.

Yu, "Consistent and Automatic Replica Regeneration" (online) Mar. 23, 2004, 14 pages.

* cited by examiner

EFFICIENT CHANGING OF REPLICA SETS IN DISTRIBUTED FAULT-TOLERANT COMPUTING SYSTEM

FIELD OF THE INVENTION

This invention relates generally to distributed computing and, more particularly, relates to fault tolerant distributed computing.

BACKGROUND

An advantage of distributed systems is the ability to continue to operate in the face of physical difficulties that would cripple a single, monolithic computing device. Such difficulties could include: sustained power outages, inclement weather, flooding, terrorist activity, and the like.

To compensate for the increased risk that individual member computing devices may become disconnected from the network, turned off, suffer a system malfunction, or otherwise become unusable, redundancy can be used to allow the distributed computing system to remain operational. Thus, the information stored or process executed on any one computing device can be redundantly stored on additional computing devices, allowing the information to remain accessible, even if one of the computing devices fails.

A distributed computing system can practice complete redundancy, in which every device within the system performs identical tasks and stores identical information. Such a system can allow users to continue to perform useful operations even if almost half of the devices should fail. Alternatively, such a system can be used to allow multiple copies of the same information to be distributed throughout a geographic region. For example, a multi-national corporation can establish a world-wide distributed computing system.

However, distributed computing systems can be difficult to maintain due to the complexity of properly ensuring that the individual devices comprising the system perform identical operations in the same order. To facilitate this often difficult task, a state machine approach is often used to coordinate activity among the individual devices. A state machine can be described by a set of states, a set of commands, a set of responses, and client commands that link a response/state pair to each command/state pair. A state machine can execute a command by changing its state and producing a response. Thus, a state machine can be completely described by its current state and the action it is about to perform.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose a given client command for execution by every device in the system. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given client command be executed by the devices, using the proposal number suggested in the earlier message. Each device can, at that stage, determine whether to vote for the action or reject it. A device should only reject an action if it has responded to another leader's suggestion of a higher proposal number. If a sufficient number of devices, known as a quorum, vote for the proposal, the proposed action is said to have been agreed upon, and each device performs the action and can transmit the results. In such a manner, each of the devices can perform actions in the same order, maintaining the same state among all of the devices.

Generally, the Paxos algorithm can be thought of in two phases, with an initial phase that allows a leader to learn of prior proposals that were voted on by the devices, as described above, and a second phase in which the leader can propose client commands for execution. Once the leader has learned of prior proposals, it need not continually repeat the first phase. Instead, the leader can continually repeat the second phase, proposing a series of client commands that can be executed by the distributed computing system in multiple steps. In such a manner, while each client command performed by the distributed computing system for each step can be thought of as one instance of the Paxos algorithm, the leader need not wait for the devices to vote on a proposed client command for a given step before proposing another client command for the next step.

The distributed computing system, as a whole, can be modeled as a state machine. Thus, a distributed computing system implementing complete redundancy can have each of the devices replicate the state of the overall system, so that each device hosts its own "replica" of the same state machine. Such a system requires that each replica maintain the same state. If some replicas believe that one client command was executed, while a second group of replicas believes that a different client command was executed, the overall system no longer operates as a single state machine. To avoid such a situation, a majority of the replicas can be generally required to select a proposed client command for execution by the system. Because any two groups of replicas, each having a majority, shares at least one replica, mechanisms, such as the Paxos algorithm, can be implemented that rely on the at least one common replica to prevent two groups, each containing a majority of replicas, from selecting different proposed client commands.

However, a system that is expected to run for an extended period of time must deal with devices becoming permanently retired or otherwise permanently failed. The system should therefore provide a means of swapping out some devices and replacing them with others (i.e., changing the set of state machine replicas) so that the system's tolerance of future failures is restored to its original level. Otherwise, once a quorum of failures occur, the system is no longer fault tolerant. Replacing failed devices restores the fault tolerance of the system to tolerate new failures. Additionally, the system should allow for the addition of new devices to increase the number of tolerable device failures and thereby provide greater fault tolerance. The original Paxos algorithm gives a simple description of how the system can decide to change the set of state machine replicas participating in the protocol. But the approach presented by the original Paxos algorithm does not address various special circumstances that can arise during a change in the replica set.

BRIEF SUMMARY OF THE INVENTION

A distributed computing system can be operated in a fault tolerant manner using a set of computing devices. A set of computing devices can tolerate a number of failures by implementing identical replicas of a state machine and selecting proposals using a Paxos algorithm. Embodiments of the invention allow the set of computing devices participating in the distributed computing system to be modified by adding or removing a computing device from the set, or by specifying particular computing devices for participation. Changing the participating computing devices in the set increases fault tolerance by replacing defective devices with operational devices, or by increasing the amount of redundancy in the system.

Therefore, in one embodiment of the present invention, a first set of computing devices is responsible for determining a sequence of steps to be performed by a state machine that is replicated among the devices. A second set of devices can be defined, removing the responsibility from the first set, and assuming the responsibility for determining steps in the sequence of steps to be performed by the state machine. The range of steps for which the first set is responsible is mutually exclusive with the range of steps for which the second set is responsible.

In another embodiment of the present invention, a leader of a first set of computing devices responsible for determining a sequence of steps to be performed by a state machine learns that a new set of computing devices has been chosen to succeed its set. The new set assumes responsibility for determining a sequence of steps beginning with a specified step, and the leader of the first set causes null operations to be determined as the steps to be performed in steps prior to the specified step.

In a further embodiment of the present invention, computing devices running replicas of an identical state machine host an execution module and one or more agreement modules. Each device's execution module executes steps of the replicated state machine in sequential order. Each device has an agreement module corresponding to each set of replicas in which it is a member. Agreement modules of different replica sets on the same machine each communicate with the single execution module on that machine to provide it with chosen operations for the sequence of steps.

Although the description herein focuses primarily on the operation of computing devices in a distributed computing system, it will be appreciated that the description is equally applicable to processes running on a single computing device, such as on separate processors or in separate memory spaces. Thus, additional embodiments include the operation of the modified Paxos algorithm in multiple processor environments, whether the multiple processors are physically located in one or more computing devices, and in multiple virtual machine environment, whether the multiple virtual machines are being executed by one or more computing devices. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
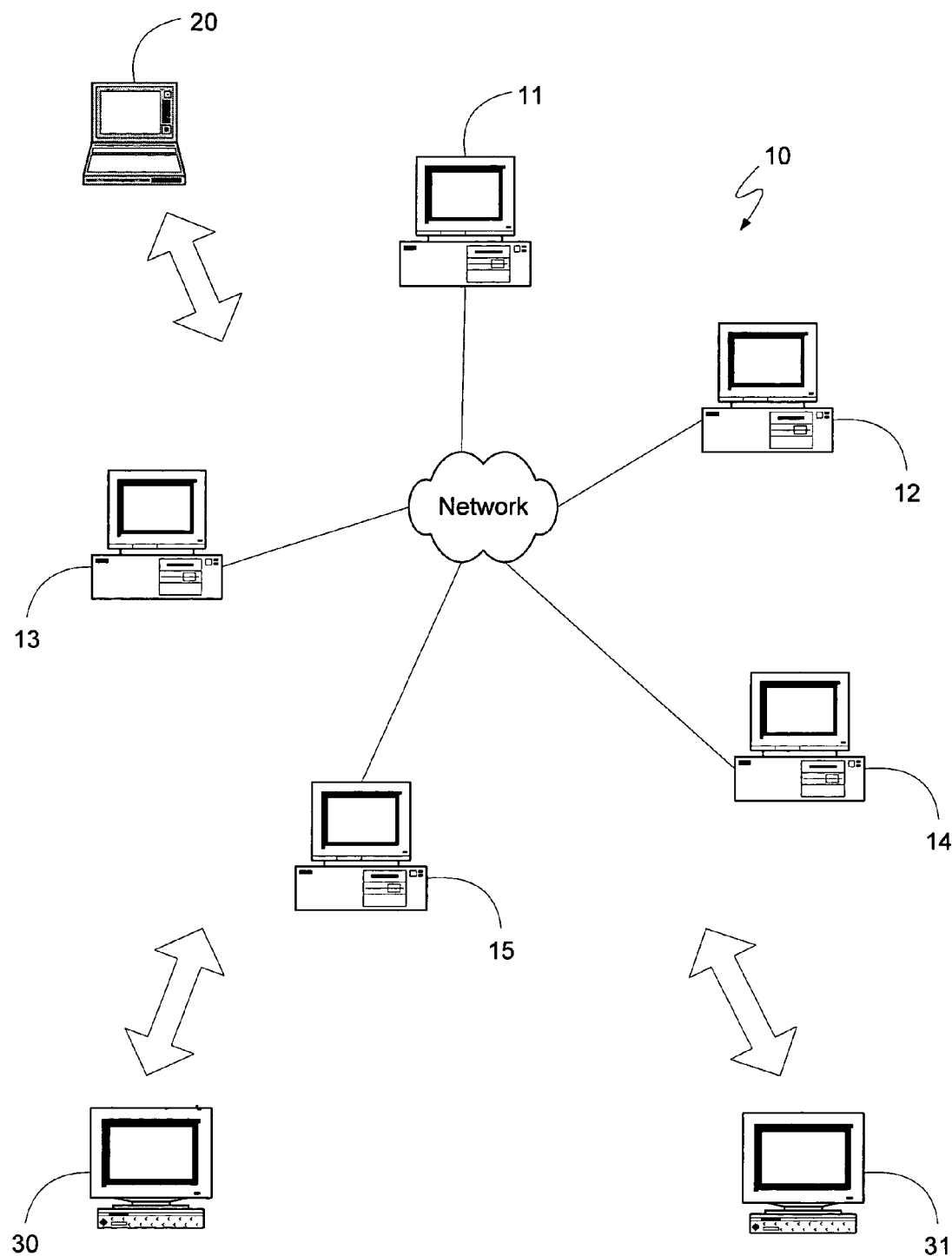
FIG. 1 is a block diagram generally illustrating an exemplary distributed computing system with which an embodiment of the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server that can act as a central storage repository for various forms of information. Such a distributed system seeks to replicate the central store on all of its constituent devices so that every client seeking to communicate with the central storage can find a convenient and efficient device with which to communicate. Furthermore, because of the distributed nature of the system, local events such as power outages, floods, political unrest, and the like may only affect a few computing devices, allowing the overall system to continue to operate properly and provide access to information and other services to clients.

Such a distributed computing system can be thought of as a state machine, with the future state of the machine defined by the current state and the action to be taken. Each constituent device of the distributed computing system can then independently execute the state machine of the overall system. The state-machine approach can be implemented asynchronously; so, precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of the functions that were executed. In such a manner, every device can have the same state and if a device fails it need only determine the last function it executed, identify, from the list, any functions that have been agreed upon since that last function, and execute those functions.

A distributed computing system acting as a server can be especially useful for serving a large amount of information to a diverse set of clients, such as a central database for a multi-national corporation, or a popular World Wide Web site. In such situations, a large number of clients can request information from the distributed computing system acting as a server. By implementing the server functionality across multiple devices, the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the proposal having the largest proposal number for which that device has already voted or an indication that the device has not voted for any previous proposals. Once the leader receives the responses from the other devices, it can determine which function to propose and request a vote for a proposed function. Each device will vote for the proposal unless it has, at some time prior to the requested vote, responded to a suggestion for a higher proposal number. If a quorum of devices votes for the proposal, then the proposal is accepted, and the leader can transmit a message to all of the devices requesting that they execute the agreed upon function.

The Paxos algorithm, however, like any other consensus algorithm, requires a large number of computing devices to tolerate failures. Specifically, to tolerate F number of failures, the algorithm requires a distributed computing system comprising at least 2F+1 number of computing devices. Of these devices, only a simple majority is needed to select commands and continue proper operation of the system. The remaining devices can remain unused until one of the devices selecting commands and operating the system fails.

Should a computing device permanently fail, however, it is desirable to remove it from the set of 2F+1 devices, and to replace it with a new device, in order that the Paxos algorithm will be able to tolerate F additional failures.

Distributed Computing Environment

Turning to the drawings, wherein like reference numerals refer to like elements, the invention is illustrated as being implemented by a distributed computing system, such as the exemplary distributed computing system 10 shown in FIG. 1. For ease of presentation only, the present invention will be described with reference to distributed computing systems such as system 10, which comprises computing devices 11 through 15, interconnected as shown in FIG. 1. As will be understood by those skilled in the art, the present invention is applicable to all distributed computing environments and is not intended to be limited in any way by the exemplary distributed computing system of FIG. 1, which has been simplified for presentation purposes.

FIG. 1 also illustrates a single client computing device 20, though the present invention is intended to operate in environments having any number of client computing devices. Client computing device 20 is illustrated as having a generic communicational connection to the distributed computing system 10. As will be known by those skilled in the art, such a communicational connection can use any communication medium and protocol, and can allow the client computing device 20 to communicate with one or more of the computing devices in the distributed computing system 10.

Additionally, FIG. 1 illustrates computing devices 30 and 31 that are not shown as part of the distributed computing system 10, but which also maintain a generic communicational connection to system 10. As above, the communicational connection can use any communication medium and protocol, and can allow the computing devices 30 and 31 to communicate with one or more of the computing devices in the distributed computing system 10. As will be described in further detail below, computing devices 30 and 31 can learn of the results of executions performed by the system 10 without being part of the system 10.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
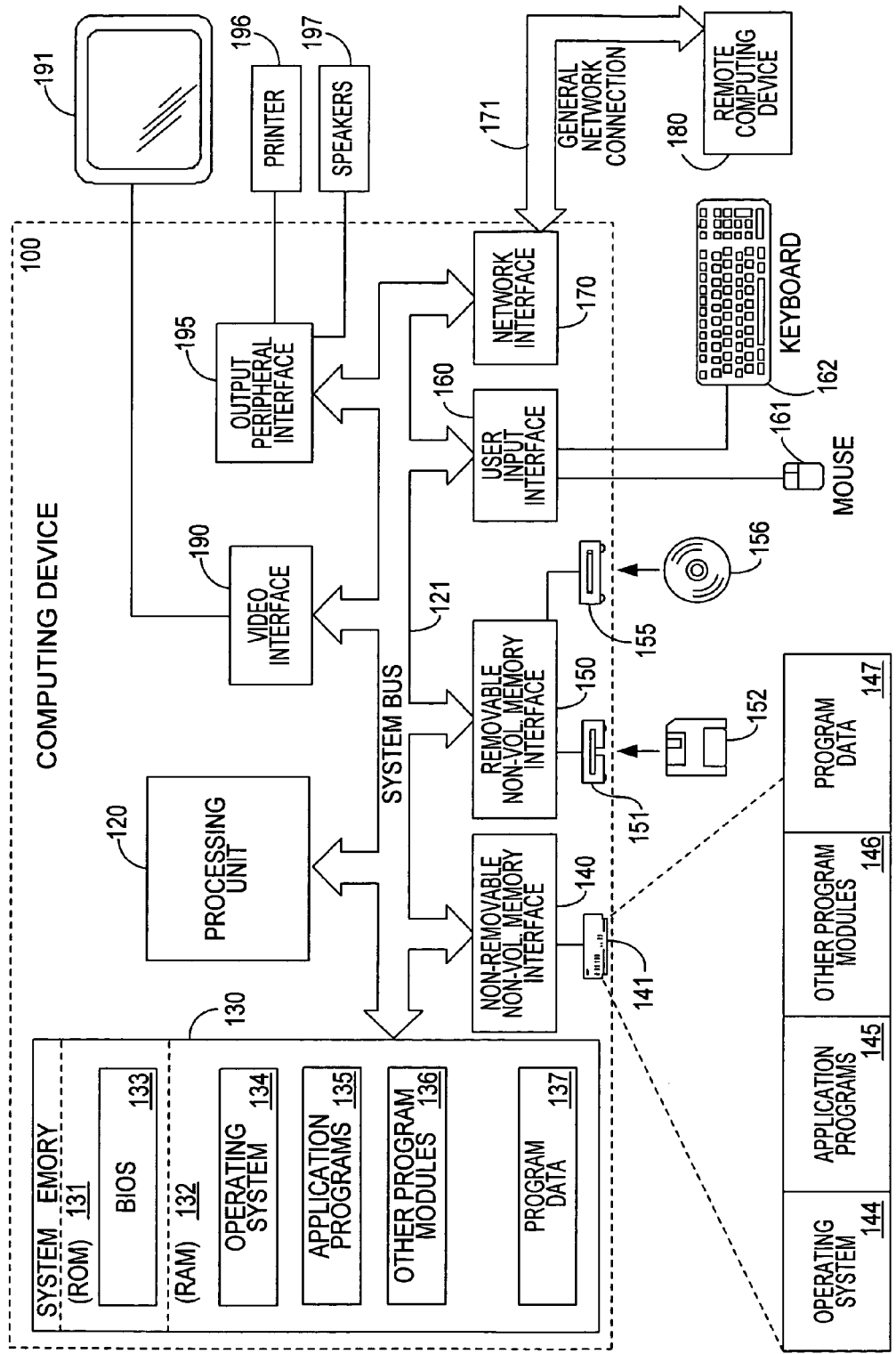
FIG. 2 is a block diagram generally illustrating an exemplary computing device with which an embodiment of the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not intended to exactly represent any of the computing devices 11-15, 20, or 30-31 illustrated in FIG. 1. The exemplary computing device 100 can implement one or more of these computing devices, such as through memory partitions, virtual machines, multiple processors, or similar programming techniques allowing one physical computing structure to perform the actions described below as attributed to multiple computing devices. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment, such as that shown in FIG. 1, using logical connections to one or more remote computers. FIG. 2 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a distributed computing system can implement a fault tolerant algorithm while allowing devices to be added and removed from the system. The Paxos algorithm, which will be described in greater detail below, can provide a mechanism of implementing a distributed computing system that can tolerate a certain number of faults provided that more than twice that number of computing devices are used. Mathematically, if the variable "F" represents the number of faults that can be tolerated, a distributed computing system of at least 2F+1 computing devices can implement the Paxos algorithm by attempting to run identical replicas of a state machine. Of these 2F+1 computing devices, any collection of at least a majority of them, in other words any collection of at least F+1 devices, can be a quorum and can select proposals in a fault-tolerant manner.

If no computing devices fail, a collection of 2F+1 computing devices can implement the state machine according to the Paxos algorithm. If one or more of the computing devices fail, one or more of the remaining F computing devices can be used to enable the system to continue to use the Paxos algorithm and operate in a fault-tolerant manner. However, if a computing device fails permanently, it may be desirable to either remove it from the collection of 2F+1 computing devices, or to add a new computing device to the collection of 2F+1 computing devices.

According to one embodiment contemplated by the present invention, an initial set of computing devices is used to provide a fault-tolerant distributed computing system. When one or more of the computing devices fails, the device can be removed from the initial set, and a new computing device may be added to the set. Consequently, the operation of the fault tolerant system can modify the set of computing devices upon which the fault-tolerant distributed computing system operates.

State Machines

In a distributed environment, such as distributed system 10 illustrated in FIG. 1, coordination among asynchronously-operating devices can be a difficult task. One mechanism for addressing these difficulties is to model the distributed computing system in terms of a state machine where the performance of a function moves the state machine from one state to another. A state machine can be described with reference to a set of states, a set of commands, a set of responses, and functions that link a response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the functions from the ordered list that the device has not yet performed. Such a state machine approach was initially proposed in the article "Time, Clocks, and the Ordering of Events in a Distributed System," by Leslie Lamport published in The Communications of the ACM, Volume 21, Number 7, July 1978, the contents of which are hereby incorporated by reference in their entirety.

Paxos Algorithm

By using a state machine approach, the synchronization of the constituent devices 11 through 15 of the distributed computing system 10, shown in FIG. 1, can be achieved by agreeing on the functions to be performed and the order in which to perform them. One method for agreeing upon a function to be performed is known as the Paxos algorithm. The Paxos algorithm allows the system 10 to operate properly even in the face of failures, where devices can stop operating without advanced warning. The Paxos algorithm requires that at least a quorum of devices agree to a function before the system as a whole performs that function. With the Paxos algorithm, a quorum can be a simple majority, or it can include more devices than that, depending upon the particular requirements of the system. However defined, a quorum can be sufficiently large such that any two quorums have at least one device in common. Detailed descriptions of the Paxos algorithm can be found in the papers entitled "The Part-Time Parliament" by Leslie Lamport, published in ACM Transactions on Computer Systems, volume 16, number 2 on pages 133-169, dated May 1998, and "Paxos Made Simple" by Leslie Lamport, published in ACM SIGACT News, volume 32, number 4 on pages 18-25, dated December 2001, which are hereby incorporated by reference in their entirety for all that they teach without exclusion to any parts thereof.

Figure 3:
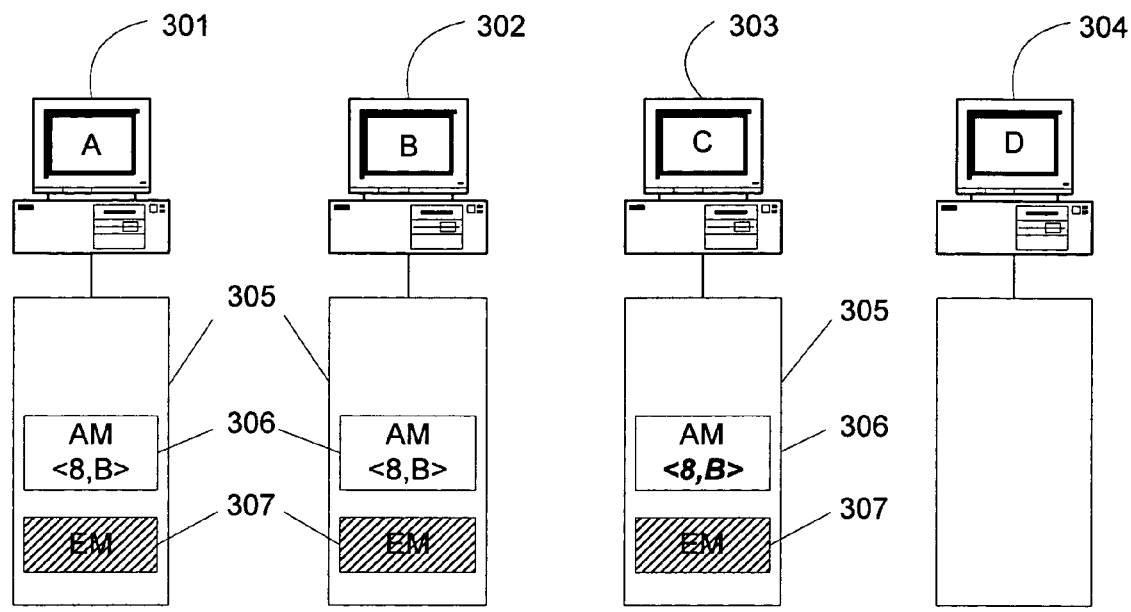
FIG. 3 is a block diagram generally illustrating an exemplary set of replicated state machines with which an embodiment of the present invention can be implemented.

For clarity, several new or alternative terms and concepts are now presented in describing the Paxos algorithm as used in embodiments of the present invention. With reference to FIG. 3, four devices 301-304 are shown. Each of devices 301-303 runs a replica 305 of a common state machine, together forming a "replica set." Device 304 is not in the replica set. Each replica 305 runs two logical modules, an agreement module 306 (AM) and an execution module 307 (EM). In a manner described below, the AMs coordinate with each other to choose an operation for each slot (or "step") in the state machine, where slot "n" is a logical container for the nth operation each state machine replica should execute. For example, slot 310 contains an operation "f" to be executed, slot 311 contains an operation "t", etc. An EM 307 learns of operation choices from the collocated AM 306.

The Paxos algorithm ensures that no two AMs ever choose different operations for the same slot by letting one replica be a "leader" and only allowing the leader to propose operations that can be selected for a slot. However, the leader may fail, so there is preferably a protocol for electing a new leader. Through the election protocol, the new leader learns enough about the actions of previous leaders that it will not make conflicting choices.

The "term of office" of a leader is called a "view", and each view is uniquely identified by a view identifier (ID), which is equivalent to the "proposal number" used in classic Paxos descriptions. That is, for each particular view, a single leader proposes all operations to be performed by the state machine during that view. Each replica keeps track of its current view and will accept operation proposals only from that view's leader. A view ID consists of a view counter and an initiating replica identifier; thus, if multiple replicas initiate views at the same time, they will start different views. In the example of FIG. 3, computing device C 303 is the leader of the displayed view, device B 302 initiated the view, and the view ID is number 8.

A leader remembers the last slot for which it proposed an operation. When a client sends it a new request, it proposes that this request be the operation in the slot following the last slot by sending a PROPOSED message to all replicas. When a replica receives a PROPOSED message from the leader of its current view, it prepares it by recording it in a local log. Then, it sends the leader a PREPARED message. When the leader has received PREPARED messages from a quorum (generally including itself), it chooses the operation, sending a CHOSEN message to all replicas. In other words, it promises no conflicting operation will ever be chosen and thus any EM may execute it.

After the leader proposes an operation, there are network and processing delays before the operation will be executed. During this time, the leader may propose further operations, to overlap the work of multiple stages of the process via pipelining.

In embodiments of the invention, each state machine makes periodic copies of its state on stable storage so the algorithm can prevent replicas' logs from growing indefinitely. Such a copy is called a "checkpoint", and the slot of a checkpoint is defined to be the slot of the last operation executed before the copy was made. The slot of a replica's last on-disk checkpoint is called its "local stable point."

Through periodic messages, the leader keeps track of replicas' local stable points and keeps them informed of the collective stable point, which is the qth highest local stable point, where q is the size of a quorum (e.g., F+1). The significance of this value is that because eventually a quorum of replicas will be functional, there will always eventually be a checkpoint available reflecting the first c operations, where c is the collective stable point. Since some replica will be able to supply state reflecting the results of all operations in slots less than or equal to the collective stable point, the operation choices for these slots need not be remembered. Thus, in an embodiment of the invention, replicas discard PREPARE entries for these slots, preventing their logs from growing indefinitely, in a process called "log truncation." To prevent any replica's log from exceeding a fixed or variable maximum log size, a leader does not propose an operation for a slot until the collective stable point is within a maximum log size of that slot.

The process by which a new leader is elected and learns enough about previous views to ensure it does not propose conflicting operations is called "view change." As an overview, if any replica learns, by means outside the scope of this overview, that the leader may have failed, it may initiate a view change. It chooses a new view ID greater than its current view ID and transmits VIEW-CHANGE messages to all replicas. A replica receiving a VIEW-CHANGE message enters this new view unless it is already in a higher numbered view. It replies to the initiator with a VC-REPLY message describing the prepare entries in its log. Once the view change initiator has VC-REPLY messages from a quorum, it chooses a leader for the new view and supplies it these messages. The new leader uses these messages to learn enough about previous views to ensure it makes no conflicting proposals. The view change process is described more fully in the earlier cited references of Lamport. In the example of FIG. 3, device B 302 initiated the view change for view number 8.

In embodiments of the invention, through periodic messages, the leader tells each replica how many consecutive operations have been chosen. An AM may thus hear that the next operation needed by its EM has been chosen. However, the AM may not know what operation was chosen for this slot, perhaps because it was offline when the leader sent the PROPOSED and CHOSEN messages for that operation. In this case, the AM asks its peer AMs if any of them has this operation in its cache of recently chosen operations. An AM keeps a cache of recently chosen operations which includes operations from its log, but additionally may include operations that had been locally truncated from its log. If an AM has the operation in its cache, it provides it to the requesting peer AM, obviating the need for the requesting AM to perform a full state transfer. If no peer can supply this operation, and the AM learns that the leader discarded the operation due to log truncation, the replica's EM cannot proceed. At this point, it fetches state from a more up-to-date replica.

Modified Paxos Algorithm Using Change of Replica Sets

As can be seen from the above description, it may not be necessary for each of the computing devices to participate in an instance of the algorithm by hosting a replica of the common state machine in use. In other words, some devices may not initially be members of the state machine replica set in use, such as device D 304 in the example of FIG. 3. It may be desirable to add such a device to the replica set in order to, for example, replace a device that has permanently malfunctioned or has been removed from the distributed system. By changing replica sets, computing devices can be added and removed from consideration by the Paxos algorithm. Thus, a removed device is not counted in the 2F+1 devices from which a quorum is taken. Embodiments of the present invention facilitate the addition and removal of computing devices (more precisely, their state machines) from the replica set.

A general description of an approach to changing replica sets is given as follows: The state machine contains, as part of its state, the set of replicas responsible for the service. There is a constant pipeline depth "α" for holding a number of pending operations such that a change to the replica set takes effect after α operations. In other words, if the replica set is changed in the nth slot, the new replica set allows for up to α pending operations by choosing operations only in slots n+α and higher. A large α is desirable since α limits the depth of operation pipelining: the leader cannot propose operation n+α until it knows the replica set responsible for that operation, and it may not know this until it executes operation n.

Embodiments of the invention modify the classic Paxos model to have each view be replica-set-specific, i.e., refer only to a fixed replica set. In this way, replica sets do not interfere with each other and views are simpler to manage because they refer to a fixed replica set. To ensure views are replica-set-specific, embodiments of the invention extend the view ID description to include an "epoch" value, described below. Each device runs a separate agreement module (AM), labeled by epoch, for each replica set in which it is currently an active member. If a device is in multiple replica sets, its multiple AMs operate independently and concurrently, each in its own epoch, and therefore in its own view.

Figure 4A:
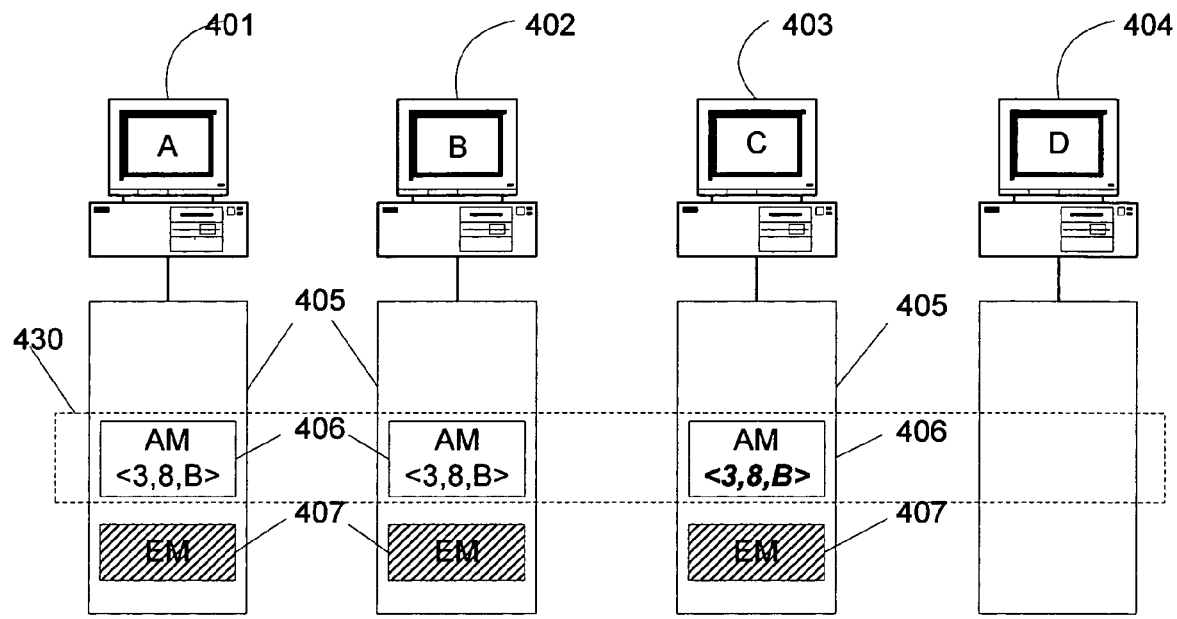
FIG. 4a is a block diagram generally illustrating an exemplary set of replicated state machines with which an embodiment of the present invention can be implemented.

An example of the extended view ID is shown with reference to FIG. 4a. A replica set 430 is shown to comprise replicas 405 from computing devices A 401, B 402 and C 403. As in the example of FIG. 3, computing device B 402 initiated the view, which has device C 403 as its leader and has a view ID number of 8. However, an additional field indicating the epoch value of the replica set is stored for each device's AM 406 for that view. In the example, the epoch value for the replica set 430 is the number 3.

Figure 4B:
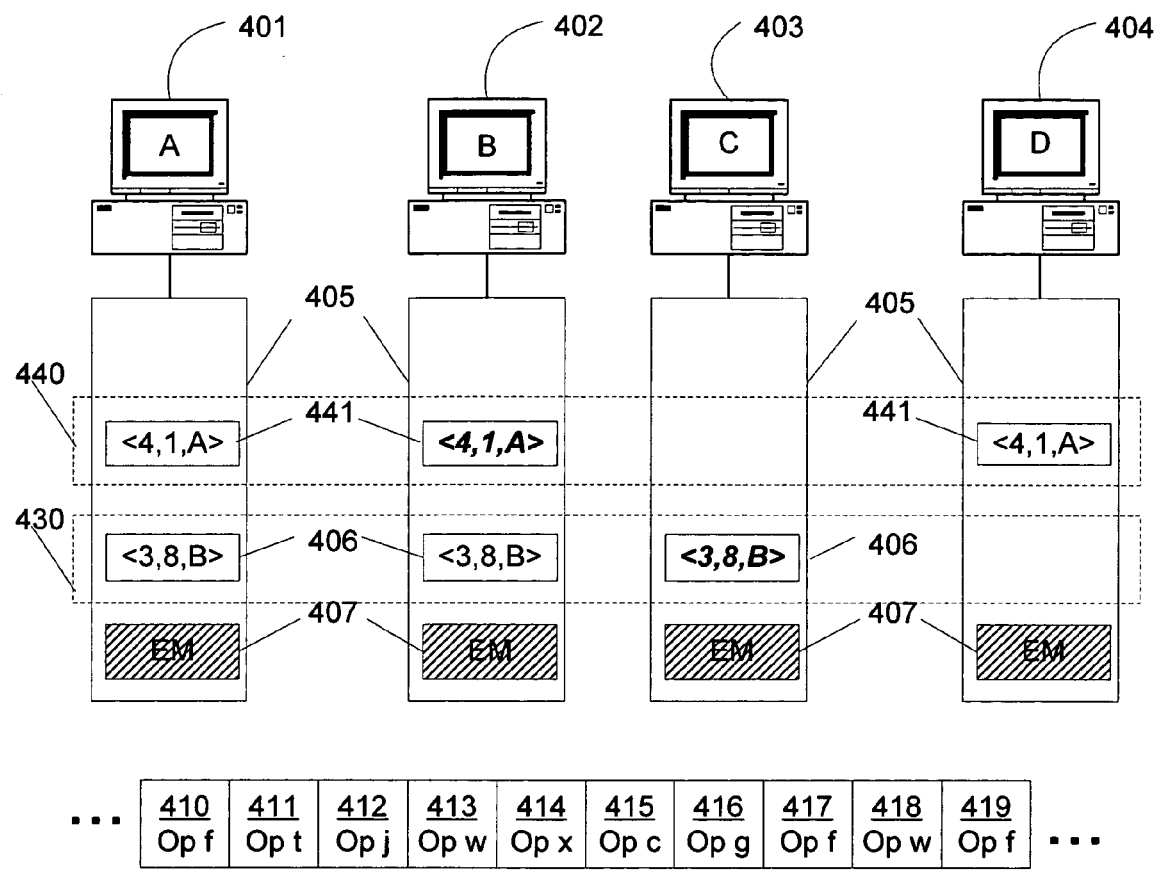
FIG. 4b is a block diagram generally illustrating an exemplary set of replicated state machines with which an embodiment of the present invention can be implemented.

An example of the use of changing replica sets with replica-set-specific views, as used in an embodiment of the invention, is now described with reference to FIGS. 4a and 4b. Replica sets are created in succession and labeled $R_i$, where the index i is the epoch of the replica set, and where $R_0$ is the initial replica set. For a given replica set, each machine in the set has a corresponding AM. In FIG. 4a, each machine in the replica set has an AM corresponding to its membership in replica set $R_3$ 430. Each of these AMs has epoch 3. Each of the AMs 406 in FIG. 4a started in view<epoch→3, view→0, initator→nil>. As time progresses, view changes occur and this view ID advances. For instance, if the first view change is initiated by replica C, the new view ID will be <3,1,C>. In FIG. 4a, several view changes have occurred, so that the view ID is <3,8,B>. When an EM executes an operation creating a new replica set, $R_4$ 440 in FIG. 4b, it notifies the members of the new replica set to each start up an AM with the appropriate epoch. If some machine is in both $R_3$ 430 and $R_4$ 440, this will cause it to be running two independent AMs 406 and 441. The new AM will start in view <4,0,nil>This view ID is independent of whatever view ID $R_3$ is in, and will advance independently of that view. The AMs with replica set $R_4$ 440 elect as leader some AM in replica set $R_4$ 440; this leader need not be on the same machine as the leader of replica set $R_3$ 430. In FIG. 4b, view changes have advanced the AMs 440 to view ID <4,1,A>.

By referring to a fixed replica set, views are easy to manage in embodiments of the invention. View changes, for example, involve a clearly defined set of participants: all AMs in the replica set. These are the AMs to which a view change initiator sends VIEW-CHANGE messages, and VC-REPLY messages from a majority of these constitute a quorum of replies sufficient for the next leader to proceed. Furthermore, it is clear when an AM is responsible for view change initiation and when it is eligible to be a leader: it is created with those responsibilities and has them until it is destroyed. Additionally, a leader knows exactly with which AMs it needs to exchange periodic messages.

Figure 5:
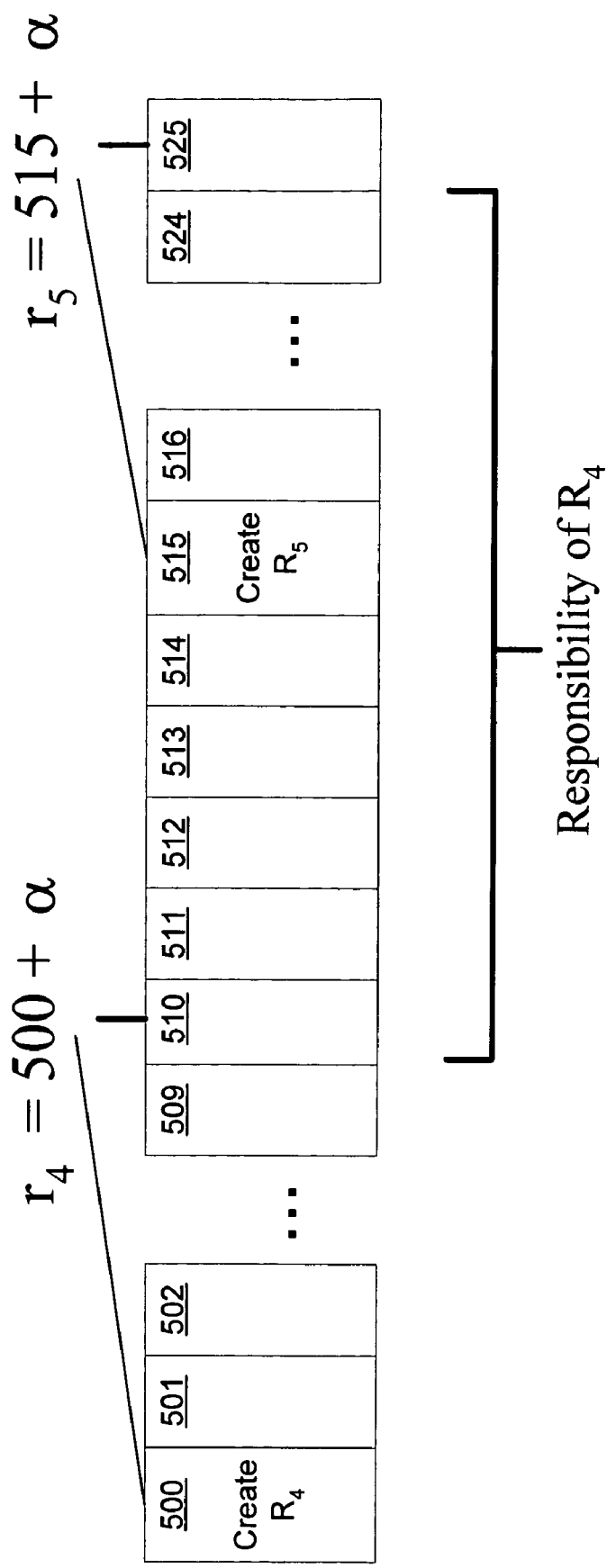
FIG. 5 is a block diagram generally illustrating an exemplary set of replicated state machine operation slots, in accordance with an embodiment of the invention.

Turning attention to FIG. 5, to facilitate replica-set-specific views, AMs of different replicas on the same machine each communicate with the single EM on that machine to give it chosen operations. The EM executes chosen operations in slot order, as in the unmodified Paxos algorithm. Each operation comes from a single well-defined AM, since no two AMs are ever responsible for the same slot. In FIG. 5, slot 500 is the slot containing the operation that created replica set $R_4$ and slot 515 is the slot containing the operation that created replica set $R_5$. The fixed pipeline depth is α=10. So replica set $R_4$ is responsible for choosing operations in slot 510 ($r_4$=replica-set-creating slot 500+α) through slot 524 ($r_{5-1}$). A replica set does not choose an operation for which it is not responsible because a leader does not propose an operation for which it is not responsible. A leader does not propose an operation n until its collocated EM has executed operation n–α and the result of this execution specifies that the leader's replica set is responsible for slot n. Therefore, if the EM executes an operation that creates replica set $R_m$, making that set responsible for slots $r_m$ and later, AMs for replica sets $R_{m-1}$ and earlier will not make proposals for slots $r_m$ or higher.

To further facilitate replica-set-specific views, embodiments of the invention allow a leader to empty its proposal pipeline if it is aware that a new replica set has been chosen. Such leaders are known as "lame duck" leaders. Emptying the proposal pipeline is useful in scenarios such as the following: A leader of replica set $R_{m-1}$ proposes the last operation it is responsible for, $r_m$–1, and starts redirecting clients to the new replica set. It then crashes and the subsequent view change loses all the old leader's recent proposals, so the last slot for which the new leader proposed is less than $r_m$–1. Since all active clients have been redirected to the new replica set, they will not submit requests to the new primary of the old replica set, and no operation will get proposed for operation $r_m$–1. This means the state machine will not make progress, since only operations in slots $r_m$ or higher can get chosen, and they cannot be executed until operation $r_m$–1 is executed. To avoid this scenario, embodiments of the invention contemplate the following. When a leader learns that another replica set will take over at operation $r_m$, but the last slot for which it proposed an operation is less than $r_{m-1}$, it proposes null operations for each slot between the last proposed slot and $r_m$. This requires at most α–1 null operations because the last proposed slot is at least the number of operations the machine has executed, which is at least $r_m$–α. This process of emptying the pipeline ensures that execution of the state machine eventually reaches slot $r_m$.

To further facilitate replica-set-specific views, embodiments of the invention discard old, unneeded AMs. Once the collective stable point of $R_m$ becomes at least $r_m$–1, then $R_m$ is "established." That is, a quorum of its members have started, and by definition of collective stable point eventually one of them will be able to provide a checkpoint with slot at least $r_m$–1. This obviates the need for any information about operations less than $r_m$, i.e., all operations that previous replica sets (i.e., $R_0$, $R_1$, . . . , $R_{m-1}$) are responsible for choosing. Thus, when $R_m$ is established, all previous replica sets are deemed "defunct", i.e., no longer needed. Any machine learning that it has defunct AMs may destroy its defunct AMs, including their logs. If a machine destroys its only running AM, it may destroy its EM as well; it is no longer an active participant in the service.

To further facilitate replica-set-specific views, in embodiments of the invention a machine keeps only a small amount of non-volatile state for destroyed AMs: the highest epoch among destroyed local AMs ("MaxDefunct"), and the replica set corresponding to the epoch succeeding it ($R_{MaxDefunct+1}$). It supplies these to any client or remote AM that tries to initiate communication with a destroyed AM. A client hearing about a destroyed AM starts communicating with the succeeding replica set, and an AM hearing of a defunct peer knows to destroy itself.

Embodiments of the invention provide a mechanism for AMs of a replica set to ensure that its successor replica set gets established, and for the AMs to eventually learn of this establishment so they can be destroyed. When an AM of replica set $R_{m1}$ learns that its EM has executed operation $r_m-1$, i.e., the last operation for which this AM's replica set is responsible, it creates a thread that periodically sends an IS-SUCCESSOR-UP-TO-DATE message to each AM in the new replica set. Such a message asks if the recipient's local stable point is at least $r_m-1$ and, if not, offers to supply it a checkpoint at that slot or later. It does not transmit such messages to AMs that have already responded affirmatively. Eventually, it receives affirmative responses from a quorum of the new replica set and thereby learns that $R_m$ is established. At this point, it knows it is defunct and destroys itself.

Because every AM in $R_{m-1}$ sends IS-SUCCESSOR-UP-TO-DATE messages, eventually one of them establishes $R_m$. The responsibility of sending IS-SUCCESSOR-UP-TO-DATE messages could be assigned to only the leader of $R_{m-1}$. Alternatively, the responsibility of sending IS-SUCCESSOR-UP-TO-DATE messages is assigned to all AMs, rather than to only the leader of $R_{m1}$. This allows a new replica to obtain its initial checkpoint sooner if the EM of the old replica set's leader is behind. Also, it spreads the load of providing checkpoints among the AMs of the old replica set rather than placing the entire burden on the leader. An additional reason for assigning the responsibility to all AMs pertains to an optimization using certificate chains, described below.

Figure 6:
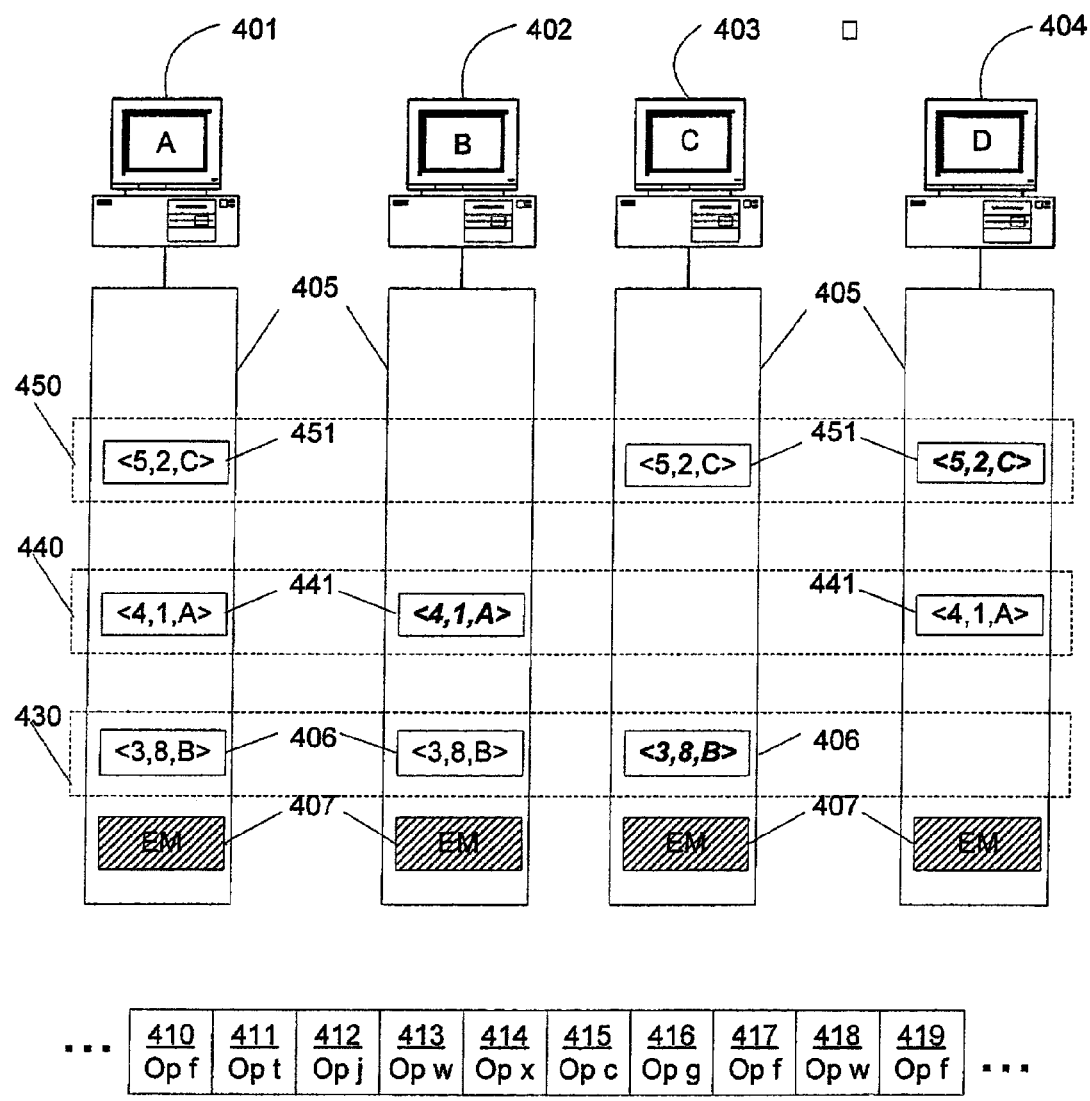
FIG. 6 is a block diagram generally illustrating an exemplary set of replicated state machines with which an embodiment of the present invention can be implemented.

An EM uses the offer to supply a checkpoint implicit in an IS-SUCCESSOR-UP-TO-DATE message in the following scenario. Suppose an EM needs to acquire the next operation from a collocated AM, but no collocated AM is responsible for this operation. For instance, in FIG. 6, if the EM on device C 403 needs, say, the operation from a slot managed by $R_4$, it has no AM to ask since its machine is not part of $R_4$. In such a case, it asks the AM responsible for the lowest operation number beyond the one it needs, in this case the AM corresponding to $R_5$. This AM realizes it cannot supply the operation the EM needs, and in fact cannot supply any operation preceding $r_5-1$. So, it tells the EM where to obtain a checkpoint that includes the effect of all operations its replica set is not responsible for, i.e., a checkpoint at $r_{51}$ or later. If one of its peer AMs in the same epoch has such a checkpoint locally, it tells the EM to contact the EM on that peer's machine. If not, but it has received a recent IS-SUCCESSOR-UP-TO-DATE message from some replica in the preceding replica set, it directs the EM to obtain a checkpoint from that replica.

If only IS-SUCCESSOR-UP-TO-DATE messages could create new AMs, the new AMs could not begin until an EM executed operation $r_{m1}$. As an alternative optimization to let AMs start sooner, embodiments of the invention allow an EM to send a JOIN message to each new replica when it executes operation $r_{m\alpha}$, which creates the set. A machine receiving a JOIN message will start an AM for the new replica set. JOIN messages are not acknowledged or retransmitted, since they are only an optimization.

Embodiments of the invention create and use "successor information" about later-established replica sets. When the EM executes an operation that creates replica set $R_m$, it creates successor information to be used by the local AM for replica set $R_{m1}$. This information includes the first operation number its successor is responsible for, $r_m$, and the identities of the succeeding replicas. The AM needs $r_m$ so if it is ever leader it will not propose an operation numbered greater than or equal to $r_m$. It needs the identities of succeeding replicas so it can later send IS-SUCCESSOR-UP-TO-DATE messages.

It is possible that rather than executing the operation $r_{m\alpha}$ that creates replica set $R_m$, the EM receives a state transfer that enables it to skip that operation. Thus, after completing a state fetch, the EM checks to see if it now knows successor information for any of its collocated AMs, and, if so, distributes it to them. To achieve this, the state includes $r_m$ and $R_m$ even for old replica sets. A state machine can retain this information indefinitely. Alternatively, the state machine may eventually discard such information in the following way. Recall that a leader will not propose an operation for a slot until its replica set's collective stable point is within a maximum log size of that slot. Thus, when the state machine executes an operation in a slot that is a maximum log size away from $r_{m1}$, it can infer that the collective stable point of replica set $R_m$ is at least $r_{m1}$ and thus replica sets with epochs less than or equal to m−1 are defunct. So, it may discard information for replica sets with epochs numbered m−1 or less, remembering only the number of the latest replica set it knows to be defunct. Thus, it may not be able to supply certain AMs with successor information, but for those AMs the EM can tell them to destroy themselves.

Embodiments of the invention use "certificate chains" to indicate that devices in a replica set are legitimate. A machine receiving a message saying it is part of a new replica set may need to verify that the sender is not lying. Normally trust is not an issue in fail-stop consensus. When replica sets change, however, machines exchanging such a message are not yet in the same fail-stop consensus group. A machine in the initial replica set knows it belongs there via a service certificate, i.e., a certificate signed by a trusted certification authority (CA) specifying the initial replica set. Because the CA may be offline during a replica set change, embodiments of the invention use replicas to attest to new replica sets.

Figure 7:
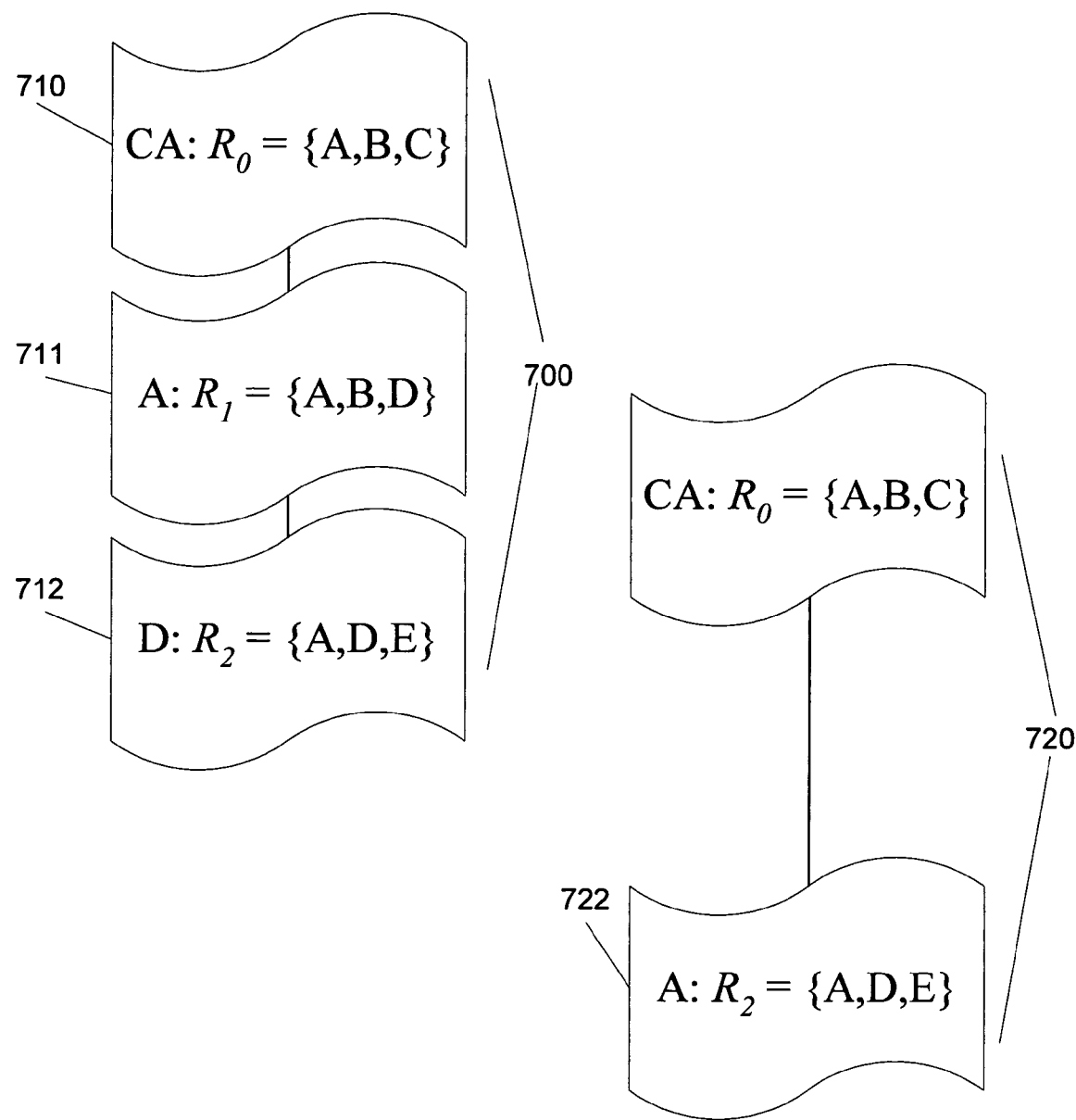
FIG. 7 is a block diagram generally illustrating an exemplary chain of replica set certificates, in accordance with an embodiment of the invention.

A certificate chain is a sequence of certificates. Each certificate attests to a certain replica set. The first certificate in the chain is a service certificate, attesting to the initial replica set $R_0$. Each other certificate is signed by a member of a preceding replica set. With reference to FIG. 7, an example of a certificate chain 700 is shown. A certifying authority (e.g., a trusted third party) issues a certificate 710 that replica set $R_0$ consists of devices A, B, and C. Device A, a member of replica set $R_0$ certifies that replica set $R_1$ consists of devices A, B and D in a certificate 711. Device D issues a certificate 712 certifying that replica set $R_2$ consists of devices A, D and E.

If a machine receives a certificate chain showing it is in a particular replica set, it can be sure this is so. The new AM saves this as its origin chain. For AMs in $R_0$, the service certificate itself is an origin chain. When an AM needs to tell a member of its successor replica set to create an AM, it signs a certificate describing the new replica set, appends it to its origin chain, and sends this as the new AM's origin chain.

Embodiments of the invention use two optional optimizations to help keep origin chains short. First, if one replica set is attested to by some certificate, and the replica set contains the signer of some subsequent certificate in the chain, then all intermediate certificates in the chain between the two can be removed. Second, an AM can replace its origin chain if it receives a shorter one from another predecessor. For instance, again with reference to FIG. 7, if E receives a chain 700 from D, then later A sends it a chain identical to chain 700 except that A signed its last certificate 712, E can remove the unnecessary middle certificate 711 to produce the shorter chain 720, then replace its origin chain 700 with this shorter chain 720. The opportunity to receive shorter certificate chains from predecessors is possible because every AM in a replica set, not just the leader, sends IS-SUCCESSOR-UP-TO-DATE messages, as discussed above.

Embodiments of the invention provide an interface by which a state machine can change the replica set. A state machine, while executing an operation, may invoke a change_replicas( ) function, specifying an array of machines to be included in the new replica set.

Embodiments of the invention use policies to determine when replica sets should change. In some embodiments, administrators explicitly manage replica sets by directing a client to submit a replica set change request. The state machine ignores requests lacking evidence of administrative authority. An administrator might use an explicit request, for example, to permanently retire a machine or to deploy new machines for additional fault tolerance.

In some embodiments, replica set changes are performed automatically, in order to cope with persistent machine failures without requiring an administrator. Each EM sends a special client request to the service at a regular interval, e.g., every five minutes, reporting itself alive. The state machine keeps track of extra state consisting of the last time each EM reported itself alive. This state is completely determined by operations, and not by local clocks on each replica, so each operation includes a timestamp assigned by the leader, and each operation is said to execute at a certain "time." Additional details on executing operations at a given time are discussed in Adya, et al., "FARSITE: Federated, available, and reliable storage for an incompletely trusted environment," in Proc. 5$^{th}$ OSDI, pp. 1-14, Boston, Mass., December 2002, which is hereby incorporated by reference in its entirety for all that it teaches without exclusion to any part thereof. At a given interval, e.g., every hour, the state machine checks whether the oldest last-alive time among replicas is more than an hour old. If so, it assumes the corresponding device is persistently failed, and calls the change_replicas( ) function to replace it in the replica set.

The state machine also deterministically chooses a new device to be the replacement. Devices willing to be replicas periodically send special client requests to the service. Such a request contains a certificate from an accepted authority authorizing the sender to participate in the fail-stop service. The state includes a mapping from potential replicas to timestamps when those machines last made such a request. To choose a new machine, the state machine makes a pseudorandom but deterministic choice among those machines whose timestamps are sufficiently recent.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. In a fault-tolerant distributed computing system comprising a first set of computing devices, each computing device in the first set executing a replica of a state machine, operations to be performed on the state machine being proposed by a leader of the first set, a method of creating a second set of computing devices, each computing device in the second set executing a replica of the state machine, the method comprising:

requesting, by computing device in the first set, to create the second set;

agreeing, among a quorum of the devices in the first set, that the computing devices comprising the second set will execute the state machine after a given step; and proposing, by the leader of the first set, a sufficient number of null operations for the state machine in order to arrive at the given step.

2. The method of claim 1 wherein the method is initiated automatically in response to a policy.

3. The method of claim 1 wherein the method is initiated in response to an explicit user request.

4. The method of claim 1 further comprising:

verifying, by one or more computing devices in the second set, an authenticity of one or more computing devices in the first set.

5. The method of claim 1 wherein operations proposed by the leader are performed by the state machine only if a quorum of computing devices in the first set agree to the proposal.

6. In a fault-tolerant distributed computing system comprising a plurality of replicated computing devices, a first set of the replicated computing devices determining operations to be performed by a state machine in a first sequence of steps, and a second set of the replicated computing devices determining operations to be performed later by the state machine in a second sequence of steps, where the first sequence and second sequence are mutually exclusive, a computer-recordable storage medium including computer-executable instructions for execution on a first replicated computing device, the computer-executable instructions facilitating performance by:

an execution module for executing operations in steps of the state machine; and a first agreement module for coordinating with other replicated computing devices in the first set to determine operations in the first sequence.

7. The computer-recordable storage medium of claim 6, the computer-executable instructions further facilitating performance by:

a second agreement module for coordinating with other replicated computing devices in the second set to determine operations in the second sequence.

8. The computer-recordable storage medium of claim 6 wherein the first agreement module is destroyed after the execution module executes the steps of the first sequence.

9. The computer-recordable storage medium of claim 8 wherein the destroyed first agreement module maintains information about the second set of replicated computing devices.

10. The computer-recordable storage medium of claim 8 wherein the execution module is destroyed if no agreement modules remain on the replicated computing device.

11. The computer-recordable storage medium of claim 8 wherein, prior to being destroyed, the first agreement module polls one or more replicated computing devices in the second set to ensure the second set of replicated computing devices are determining operations to be performed by the state machine.

12. The computer-recordable storage medium of claim 11 wherein, prior to being destroyed, the first agreement module ensures that a quorum of replicated computing devices in the second set have stored in a stable storage the state of the state machine immediately following performance of the last operation in the first sequence of steps.

13. The computer-recordable storage medium of claim 6 wherein the first set of replicated computing devices includes a leader device, and an operation in the first sequence is performed by the state machine only if a quorum of replicated computing devices in the first set agree to a proposal for that operation by the leader device.

14. In a fault-tolerant distributed computing system comprising a plurality of replicated computing devices, a first set of the replicated computing devices determining operations to be performed by a state machine in a first sequence of steps, and a second set of the replicated computing devices determining operations to be performed by the state machine in a second sequence of steps, where the first sequence and second sequence are mutually exclusive and where the first sequence of steps precedes the second sequence of steps, a replicated computing device comprising:
  an execution module on a storage facility associated with the replicated computing device, the execution module for executing operations of the state machine; and
  a first agreement module on a storage facility associated with the replicated computing device, the first agreement module for coordinating with other replicated computing devices in the first set to determine operations in the first sequence.

15. The computing device of claim 14 further comprising:
  a second agreement module on a storage facility associated with the replicated computing device, the second agreement module for coordinating with other replicated computing devices in the second set to determine operations in the second sequence.

16. The computing device of claim 15 wherein the execution module performs null operations until a step determined by the first set, and performs operations of the second sequence after the determined step.

17. The computing device of claim 14 wherein the first agreement module is destroyed after the execution module executes the steps of the first sequence.

18. The computing device of claim 17 wherein, prior to being destroyed, the first agreement module polls one or more replicated computing devices in the second set to ensure the second set of replicated computing devices are determining operations to be performed by the state machine.

19. The computing device of claim 18 wherein, prior to being destroyed, the first agreement module ensures that a quorum of replicated computing devices in the second set have stored in a stable storage the state of the state machine immediately following performance of the last operation in the first sequence of steps.

20. The computing device of claim 17 wherein the destroyed first agreement module maintains information about the second set of replicated computing devices.

21. The computing device of claim 17 wherein the execution module is destroyed if no agreement modules remain on the replicated computing device.

* * * * *